June 22, 1926.
H. S. RYLAND
1,589,664
LIGHT PROJECTOR ESPECIALLY SUITABLE FOR USE UPON VEHICLES
Filed May 7, 1923
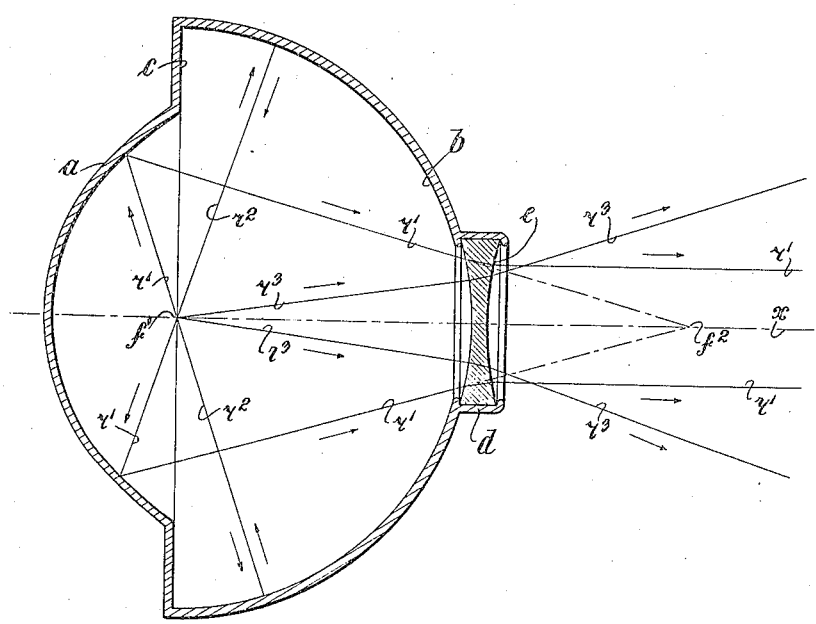
Herbert Sidney Ryland Inventor
By B. Singer Atty Patented June 22, 1926.

1,589,664

UNITED STATES PATENT OFFICE.

HERBERT SIDNEY RYLAND, OF LONDON, ENGLAND.

LIGHT PROJECTOR ESPECIALLY SUITABLE FOR USE UPON VEHICLES.

Application filed May 7, 1923, Serial No. 637,331, and in Great Britain May 17, 1922.

This invention relates to light projectors especially suitable for use upon vehicles, and has for its object to provide a compact and efficient light projector in which all the rays proceeding from the source of illumination are utilized to the greatest advantage.

The light projector constructed according to my invention comprises in combination, an elliptical reflector having the source of light at one focus, a hemispherical reflector facing the said elliptical reflector and having its centre of curvature at the same focus of the ellipse, and a suitable diverging lens or objective or combination located in an aperture, or in an extension opposite to an aperture at the vertex of the hemisphere, the virtual focus of the said lens or combination coinciding approximately with the conjugate focus of the said ellipse, and the lens being placed between the source of light and the conjugate focus.

In the preferred construction, the hemispherical reflector is of greater diameter than the minor axis of the ellipse, and the edges of the two reflectors lie in a plane which is perpendicular to the major axis of the ellipse and contains the source of light.

In order that my invention may be clearly understood, I will now proceed to describe the same with reference to the accompanying drawing, which shows a diagrammatic longitudinal section of a light projector made according to my invention.

$a$ is an elliptical reflector having a focus at $f^1$, $b$ is a hemispherical reflector, facing the reflector $a$ and having its centre of curvature at $f^1$. As will be seen, the radius of the hemisphere is greater than an ordinate of the ellipse at the focus, and the construction is such that the edges of the reflectors are located in a focal plane at right angles to the major axis of the ellipse, the edges being connected by a ring or the like $c$.

At the vertex of the reflector $b$ is a flanged aperture $d$ carrying a diverging lens $e$. This lens is of such type that its virtual focus coincides approximately with the conjugate focus $f^2$ of the ellipse.

The source of light, e. g., an electric filament is placed at $f^1$.

With this construction, it will be seen, that all the light proceeding from the source of illumination is employed to the greatest advantage.

A ray, such as $r^1$ reflected from the elliptical reflector $a$, proceeds in the direction of the conjugate focus $f^2$ but on meeting the lens $e$ is refracted from its course and proceeds substantially parallel to the principal axis $x$.

Any ray $r^2$ for instance the one diametrically opposite to the ray $r^1$, is simply reflected back by the reflector $b$ through the source of light at $f^1$ and then reflected by the reflector $a$ as previously explained for the ray $r^1$.

A ray $r^3$, proceeding directly from the source to the lens $e$, will, according to its position, be caused to diverge more or less from the axis $x$ after leaving the lens. As a result, there is obtained an intense, practically cylindrical beam of light, surrounded by a conical divergent beam of less intensity.

As with this construction of lamp, the aperture is reduced to a minimum, dazzle effects are practically eliminated, and the overall length of the projector is very small.

In place of a single diverging lens a combination of two or more lenses may be provided, adapted to intercept the rays before they reach the conjugate focus and to cause them to diverge and become substantially parallel.

The lens or combination may be carried by a tubular extension, which may be adjustable and located at the vertex of the hemisphere.

In place of an elliptical reflector, its optical equivalent may be used, such for example as a Mangin mirror, corrected for two conjugate foci equivalent to those of the ellipse.

I am aware that in the case of a projecting lamp of the type comprising an elliptical projecting mirror behind the source of light and a hemispherical reflecting mirror in front of the said source of light and directed towards the projecting mirror, it has been proposed to provide an aperture in the hemispherical mirror and a lens or combination of lenses arranged forwardly of the said aperture, which lens or lenses is or are adapted to gather and project forwardly rays of light in the central part of the beam projected from the rear mirror, and to cause the outer rays in the remaining annular part of the beam to become diffused and divergent.

The distinguishing feature between the foregoing arrangement and that forming the subject of the present invention is that in the known construction the lens or combination is of a type adapted to gather the rays after they have come to a focus and commence to diverge, whereas with my combination the rays are intercepted before coming to a focus and caused to diverge sufficiently to render them approximately parallel.

What I claim as my invention and desire to secure by Letters Patent in United States of America is:—

In a unitary light projector, the combination of a source of light, an elliptical reflector having its edge terminating at the inner focal plane, said source of light being placed at the inner focus of the reflector, a hemispherical reflector facing the elliptical reflector and having its center of curvature at the said focus and its periphery outside the periphery of the elliptical reflector, a ring lying in said focal plane and connecting the peripheries of the two reflectors, an aperture at the vertex of the hemispherical reflector between the source of light and the second focus of the elliptical reflector, and a diverging lens located in said aperture and having its virtual focus coinciding substantially with the said second focus.

In witness whereof I affix my signature.

HERBERT SIDNEY RYLAND.